Sept. 15, 1942.  W. J. BRETH  2,295,542
BAND BUILDING DRUM
Original Filed July 6, 1938

INVENTOR
Walter J. Breth
BY
Evans + McCoy
ATTORNEYS

Patented Sept. 15, 1942

2,295,542

UNITED STATES PATENT OFFICE 2,295,542

BAND BUILDING DRUM

Walter J. Breth, Akron, Ohio, assignor to The General Tire & Rubber Company, Akron, Ohio, a corporation of Ohio Original application July 6, 1938, Serial No. 217,708. Divided and this application June 26, 1941, Serial No. 399,791

2 Claims. (Cl. 33—129)

This invention relates to machines for forming fabric bands for use in building pneumatic tire casings, and more particularly to a band measuring and forming drum, this application being a division of my copending application Serial No. 217,708, filed July 6, 1938.

A tire factory requires a large number of tire building machines, each adapted to build a tire of a certain size. The tire building operation, particularly the application of the first layers of fabric to the drum, is relatively a slow and laborious one. It has been found that the output of the tire building machines can be greatly increased by forming base bands of fabric and rubber independently of the tire building machine, which are adapted to be placed upon the drums of the tire building machines and to receive the bead rings, so that the operation on the tire building machines begins with the application of the beads to a previously formed band.

It is the object of the present invention to provide a band building and measuring drum upon which cord fabric in the form of a single ply continuous strip may be delivered to the drum, wound about the drum, and measured to form bands of various circumferences suitable for various size tire casings.

Reference should be had to the accompanying drawing, in which.

Figure 1:
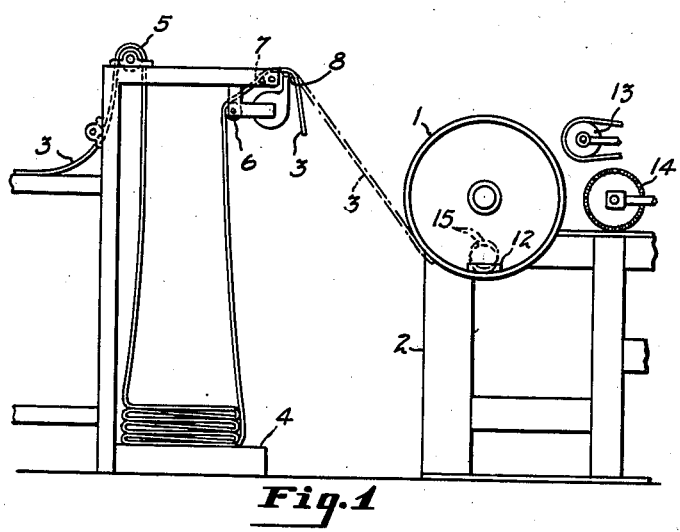
Figure 1 is a fragmentary diagrammatic view showing the drum and associated parts of the machine in side elevation.
Figure 2:
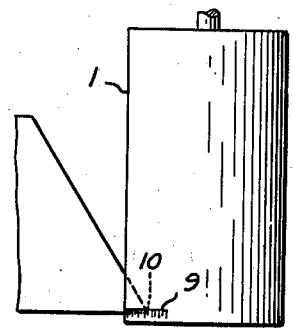
Fig. 2 is a top plan view of the drum with the forward edge of the strip applied to the drum.

Referring to the accompanying drawing, the band measuring and forming drum indicated by the numeral 1 is supported at its inner end on a suitable frame 2, the outer end of the drum being free to permit a band formed on the drum to be removed over the outer end of the drum. Cord fabric for forming bands on the drum 1 is supplied in the form of a continuous single ply strip 3, the supply of which is maintained on the platform 4. The fabric strip is supplied to the platform 4 from a suitable source over a feed roller 5 above the platform. The strip passes from the platform upwardly over guide rollers 6 and 7 which are spaced a short distance laterally from the drum and above the drum. A solvent applicator 8 may be mounted adjacent the rollers 6 and 7 to apply solvent to the underside of the fabric strip. The operator pulls the fabric by hand over the rollers 6 and 7 to the drum, applies the end of the fabric to the surface of the drum, and winds the fabric on the drum by turning the drum manually. The drum is provided adjacent its outer end on its periphery with a circumferentially extending graduated scale 9 and adjacent one end of the scale there is a finger depression 10 in which the leading edge of the bias cut fabric is placed in starting to wind the fabric on the drum. The drum is provided on its interior at a point diametrically opposite the scale 9 with a weight 12 so that the drum when released will return from any position to which it may have been moved to the starting position in which the weight is directly beneath the axis, and the scale 9 and finger depression 10 are at the side of the drum toward which the fabric is fed, as shown in Fig. 2.

Figure 3:
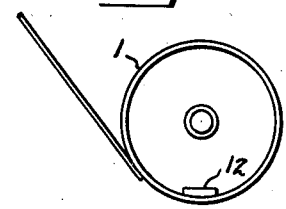
Fig. 3 is a side elevation of the drum and strip in the positions shown in Fig. 2.
Figure 4:
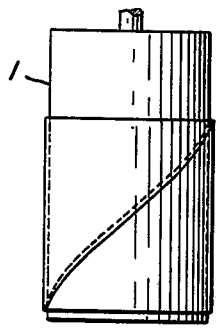
Figs. 4 and 5 are top plan view and side elevation, respectively, of the drum with the fabric band thereon after a measured length has been severed from the continuous strip and the ends thereof joined together.
Figure 9:
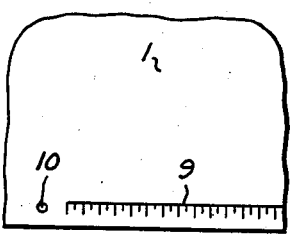
Fig. 9 is a fragmentary top plan view of the outer end of the drum on an enlarged scale.
Figures 5, 6:
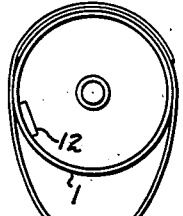
Fig. 6 is a side elevation showing the application of a sheet rubber strip known as squeegee stock to the band.

At the beginning of the band forming operation the operator places the tip of the bias cut end of the strip 3 in the depression 10 and holds it there while he turns the drum 1 by hand in the counterclockwise direction, as viewed in Fig. 3, to draw the strip first under and then over the top of the drum, so that the solvent coated side of the fabric is on the outside. The operator then measures the desired length of material in excess of the circumference of the drum by means of the scale 9, severs the strip diagonally between parallel cords, and secures the ends of the severed strip together upon the top surface of the drum to form a band such as shown in Fig. 5.

Figure 7:
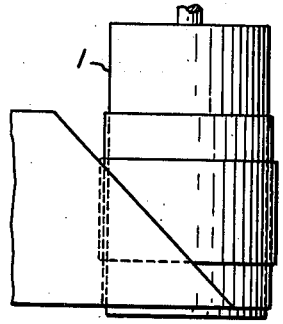
Fig. 7 is a top plan view showing the application of a second layer of fabric.
Figure 8:
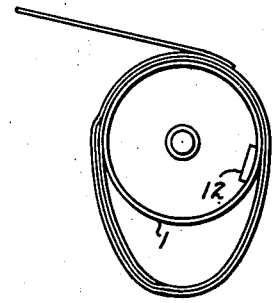
Fig. 8 is a side elevation showing the application of the second fabric layer to the band.

The diameter of the drum 1 is somewhat less than that of the smallest band to be formed on the drum, and in forming the bands the strip is wound past the end thereof held in the depression 10, so that the scale 9 will indicate where the strip should be severed to produce a band of the desired size. It is usually desirable to apply a layer of rubber in strip form between successive plies of fabric and this rubber squeegee stock may be supplied to the drum from a suitable source over a roller 13 which is mounted for movement toward and away from the surface of the drum. It is desirable that successive layers of fabric in the band be so disposed that the cords of successive layers have opposite angularity. This is accomplished, as indicated in Figs. 7 and 8, by winding the second layer on the drum in a direction opposite that in which the first layer was wound, the second layer being applied to the top of the drum and the drum then rotated in a clockwise direction to wind the second layer of fabric on the previously formed band. In order to press the layers of rubber and fabric composing the band firmly together, a pressure roller 14 may be provided below the squeegee stock feeding roller 13, the roller 14 being movable into engagement with the band on the drum to apply pressure to the band while the drum is rotated.

For the initial measuring of the strip and splicing of the measured strip to form a band of the desired size, the drum is preferably operated manually. For the subsequent operations in which additional layers of rubber and fabric are applied, the drum is preferably power driven. Any suitable disengageable driving means may be employed such as a driven roller 15 mounted for movement into or out of engagement with the interior of the drum 1.

It is to be understood that variations and modifications of the specific device herein shown and described for purposes of illustration may be made without departing from the spirit of the invention.

What I claim is:

1. In a band building machine, a band measuring and building drum for use in forming tire base bands of various circumferences materially in excess of the drum circumference, said drum having a circumferentially extending measuring scale on the periphery thereof and being mounted to rotate freely in either direction, and a weight attached to the drum eccentrically thereof which imparts a turning movement to the drum upon release of the drum to return said scale to a predetermined starting position.

2. In a band building machine, a cylindrical band measuring and building drum for use in forming tire base bands of various circumferences materially in excess of the drum circumferences, said drum having a circumferentially extending measuring scale on the periphery thereof adjacent an end of the drum and being mounted to rotate freely in either direction, and a weight attached to the interior periphery of the drum which imparts a turning movement to the drum upon release of the drum to return said scale to a predetermined starting position.

WALTER J. BRETH.